Jan. 24, 1939.  C. A. BACKER  2,145,194
ATTACHMENT FOR REFINISHING BRAKE DRUMS
Filed Aug. 7, 1937  3 Sheets-Sheet 1

INVENTOR.
CARL A. BACKER,
BY
ATTORNEY.

Jan. 24, 1939. C. A. BACKER 2,145,194
ATTACHMENT FOR REFINISHING BRAKE DRUMS
Filed Aug. 7, 1937 3 Sheets-Sheet 2

INVENTOR.
CARL A. BACKER
BY
ATTORNEY.

Patented Jan. 24, 1939

2,145,194

UNITED STATES PATENT OFFICE 2,145,194

ATTACHMENT FOR REFINISHING BRAKE DRUMS

Carl A. Backer, Houston, Tex.

Application August 7, 1937, Serial No. 157,918

6 Claims. (Cl. 82—4)

This invention relates to truing-up devices and more particularly to an attachment for use in connection with the refinishing of brake drums for hoists and winches.

Speaking from practical experience extending over a period of years from both standpoints of theory and actual practice in the field and in the shop, wherein many devices and methods have been employed for resurfacing brake drums of the winches and hoists, it may be briefly stated that numerous difficulties are encountered, despite the fact that the surroundings presented are favorable to machining operations. For example, the working surface of brake drums may become ridged or grooved circumferentially; this surface not infrequently becomes highly polished or burnished in spots and/or this wearing surface may lose its true circular form or become out-of-round. Indeed, a single brake drum may develop any or all of the above imperfections, depending upon its structure, the nature of the work to which it is subjected, and the length of the interval between changes of the brake band or lining.

It will be readily appreciated that despite the most favorable mechanical details of construction and design, hoists and winches that are subjected to operation in the field, particularly in connection with the oil industry, constantly require considerable repair and overhauling. Since such repairs are usually performed in the shops, the dismantling of the winch or hoist drum and consequent loss of time and labor is, of course, necessitated.

In an effort to overcome the above and other disadvantages incidental to repairs of brake drums in connection with machines of this type, I have devised an extremely simple and highly effective attachment which may be readily applied directly to the side walls of the winch or hoist frame in the minimum amount of time, without any previous training or skill and without the requirement of special tools or other equipment.

A further object of my present invention resides in the provision of a device of the character described which embodies means for aligning the attachment whereby it may be readily located, and remain parallel with respect to the shaft of the brake drum thereby assuring a properly finished surface for the brake lining, the finishing being accomplished without removing the drum from its mountings.

Other objects of this invention will hereinafter be set forth, or will be apparent from the description and the drawings, in which are illustrated embodiments thereof capable of carrying out the invention.

The invention, however, is not intended to be restricted to particular constructions or arrangement of parts, or to particular applications of such constructions, or to any specific manner of use, or to any of various details thereof herein shown and described, as the same may be modified in various particulars, or be applied in many various relations, without departing from the spirit and scope of the claimed invention, the practical embodiments herein illustrated and described showing some of the forms in which the invention may be practised.

On the drawings, in which the same reference characters refer to the same parts throughout, and in which are disclosed the preferred forms:

Figure 1:
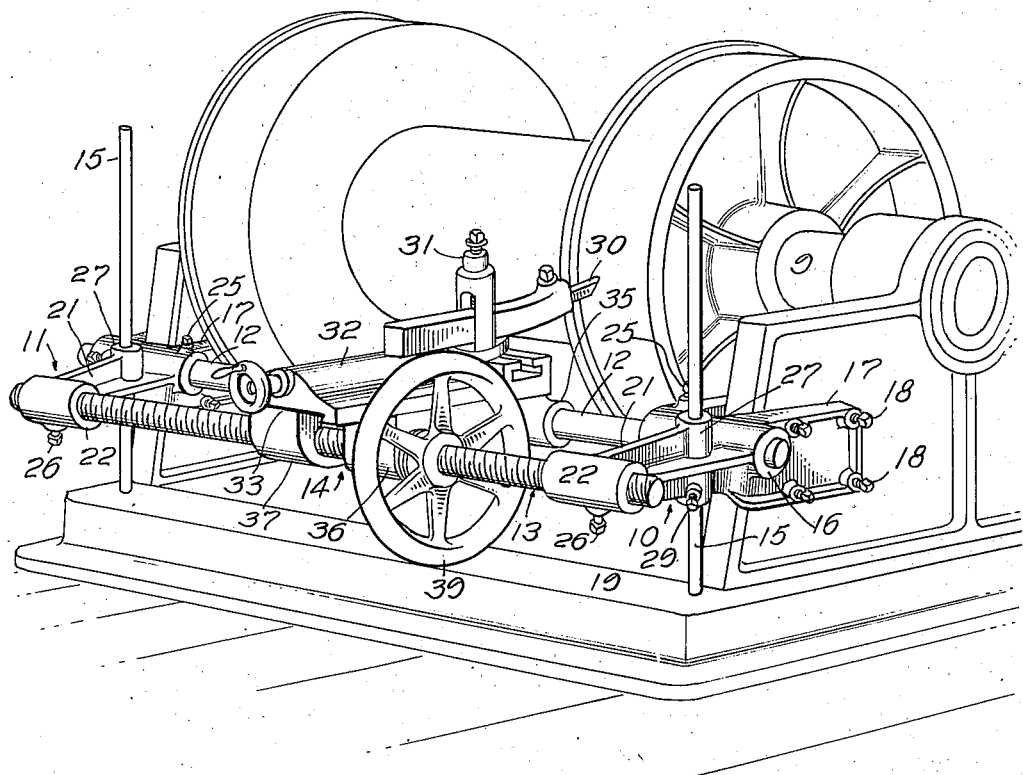
Figure 1 is a view in perspective illustrating my invention as applied to a brake drum of a hoist or winch, the latter shown somewhat diagrammatically.

My invention in the forms or embodiments shown in the drawings and briefly described comprises a pair of carrier members 10 and 11, a rod and threaded shaft 12 and 13 connecting both of the carrier members 10 and 11, tool carriage mechanism indicated generally at 14 carried by the rod and threaded shaft 12 and 13, and auxiliary supporting and aligning means shown at 15 which are adapted to be supported upon the upper surface 19 of the main frame.

Figure 2:
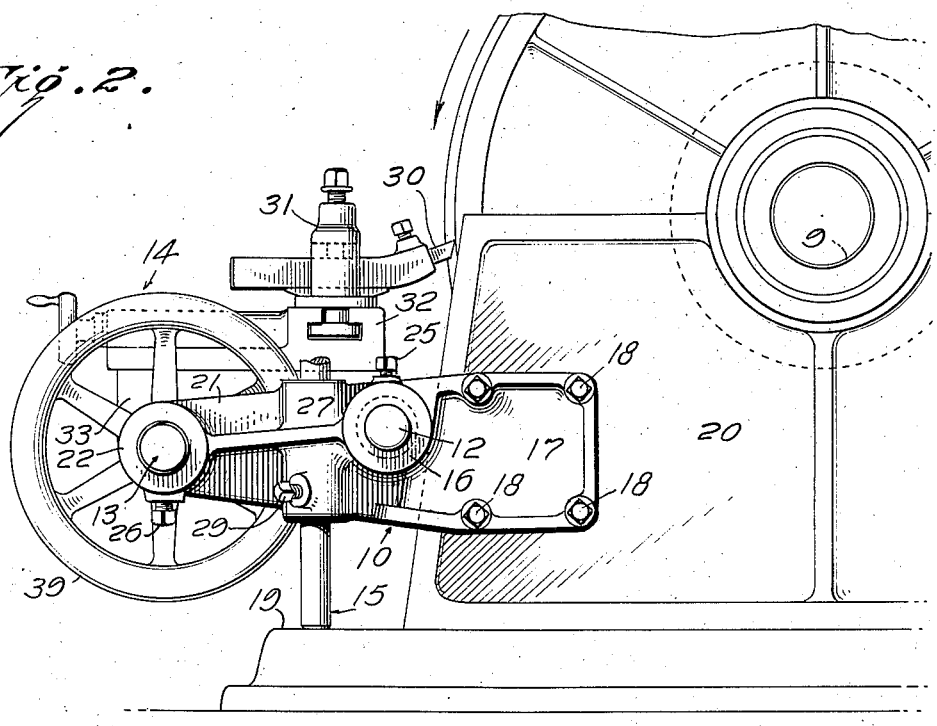
Figure 2 is a side elevation thereof.
Figure 3:
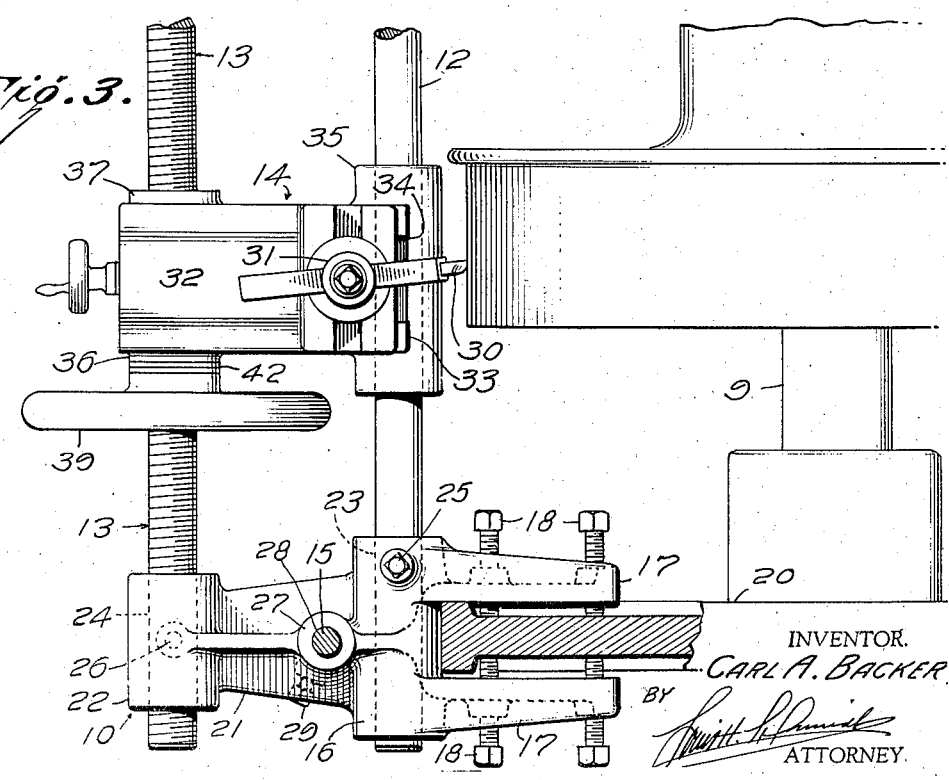
Figure 3 is a top plan view of one of the side walls of the winch frame, showing my invention as applied thereto, parts being broken away.

Referring particularly to the embodiment of my invention disclosed in Figures 1, 2, and 3 of the accompanying drawings, it will be noted that each of the carrier members 10 and 11 is substantially similarly formed, and provided with a hub body portion 16, and a clamping member having a pair of rearwardly extending arms 17 in which are oppositely extending threaded openings for the reception of set-screws 18. These rearwardly extending arms 17, comprising the clamping portions, are, of course, suitably spaced to receive the webbed side walls 20 of the hoist or winch frames to permit the truing-up device assembly to be readily placed in position or removed from the winch frame.

Each of the hub body portions 16 is further provided with an integrally cast and forwardly extending neck-portion 21 which is formed with the hub portions 22. Each of the hub body portions 16 and the hub portions 22 is provided with horizontally extending bores or openings 23 and 24, arranged in parallel with respect thereto. These bores 23 and 24, it will be appreciated, receive the ends of the rod and threaded shaft 12 and 13. Both the hub body portions 16 and the hub portions 22 are provided with set-screws 25 and 26 for the purpose of firmly securing the free ends of the rod and shaft 12 and 13, whereby an extremely rigid frame is provided.

The neck portions 21 are further formed with vertically extending hub portions 27, each provided with a vertically extending bore 28 for the reception of auxiliary supporting and aligning rod 15. These vertical hub portions 27 are likewise provided with set-screws 29 for firmly retaining the rods 15 in their proper position.

I will now proceed to describe the tool carriage 14 which is slidable upon the pair of rigidly secured parallel members as the shaft 12 and the threaded rod 13. The cutting tool 30, its tool-post 31, together with its cross-feeding mechanism 32 is substantially identical as in the usual lathe, and are mounted upon a horizontal, movable frame or support 33.

Figure 6:
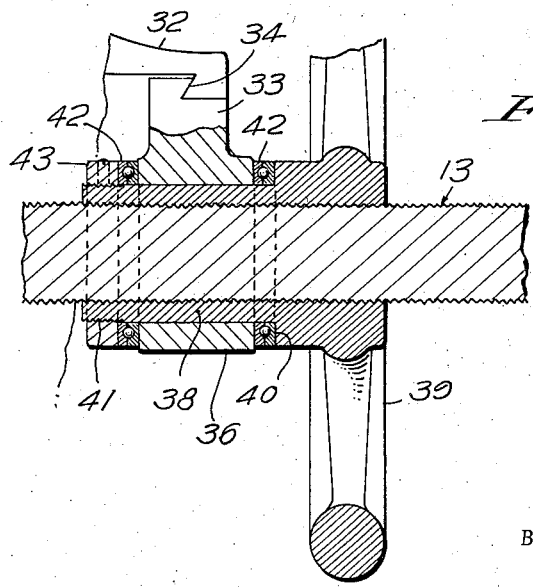
Figure 6 is a detail sectional view on a slightly enlarged scale illustrating the longitudinal feeding means for the tool carriage.

The upper surface of the movable frame or support 33 is provided with the usual dove-tailed guiding member 34, to which the cross-feed 32 is fitted, whereas the lower portion of the frame or support is provided at the rear end thereof with a substantially elongated hub member 35. This hub member is bored for a sliding fit with respect to the smooth rod 12. The forward portion of the movable frame or support 33 is preferably formed with a pair of hubs or bosses 36 and 37 and bored to align with the threaded shaft 13 as clearly shown in Figure 6 of the drawings. The hub 36 is bored substantially larger than the threaded shaft 13 for the purpose of receiving a reduced sleeve portion 38 of the hand-wheel 39. This sleeve, it will be again noted by referring to Figure 6, is provided with an annular shoulder 40 at one end and an exteriorly threaded portion 41 at its opposite end for the purpose of receiving and retaining a pair of anti-friction washers 42. Both of the anti-friction washers 42 and the hand-wheel 39 are securely held in their properly adjusted positions with respect to the hub 36 by means of a threaded nut 43. It will be appreciated that since the shaft 12 and the threaded rod 13 are arranged in parallel, both of the carrier members 10 and 11 together with the movable frame or support 14 may be readily machined and bored with the minimum amount of mechanical difficulties.

Having described the various details of this embodiment of my invention, the operation thereof will now be readily understood. Since my improved truing-up device is especially applicable for re-surfacing the drums of brakes for winches of various types and sizes, regardless of mode of mounting, I have found it desirable to first adjust and secure the vertically extending auxiliary supporting rods 15, so that when they rest upon their support 19 the rod and threaded shaft 12 and 13 will be in alignment or parallel with the main shaft 9 of the hoist or winch. The measured distance between the upper surface 19 of the frame and the vertical hubs 27, of course, depends upon the height between the surface 19 and horizontal center of the brake drum which is to be refinished. The clamping members 10 and 11 are next firmly secured with respect to the side walls of the winch frame by means of the set-screws 18. It is merely necessary now to secure the rod 12 and the threaded shaft 13 against longitudinal movement with respect to their clamping members 10 and 11 which is accomplished by tightening the set screws 25 and 26.

Figure 4:
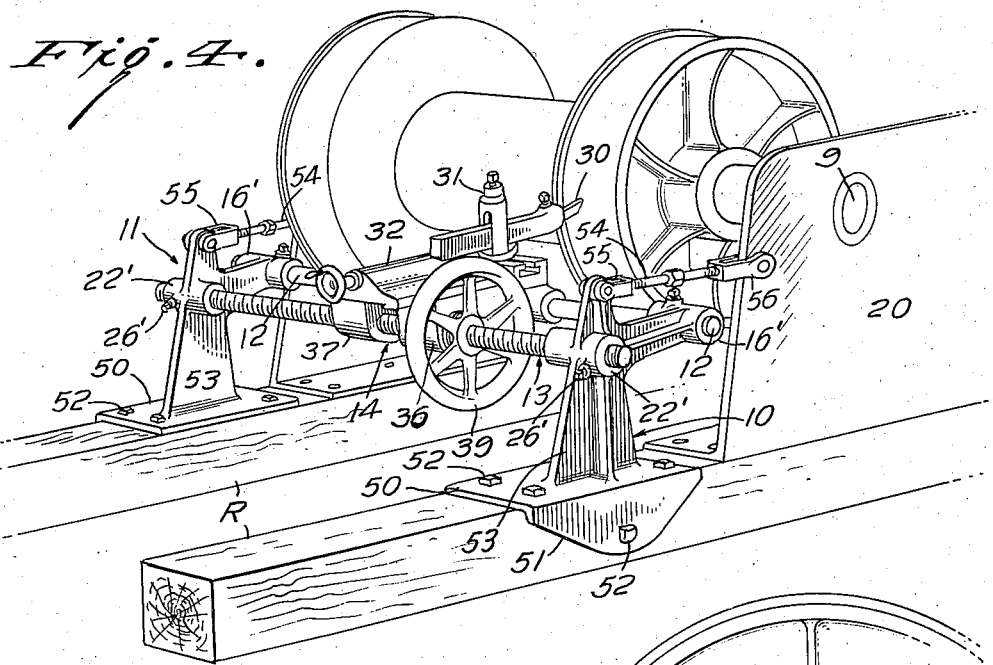
Figure 4 is a view in perspective somewhat similar to the showing in Figure 1, but illustrating another embodiment of the invention.
Figure 5:
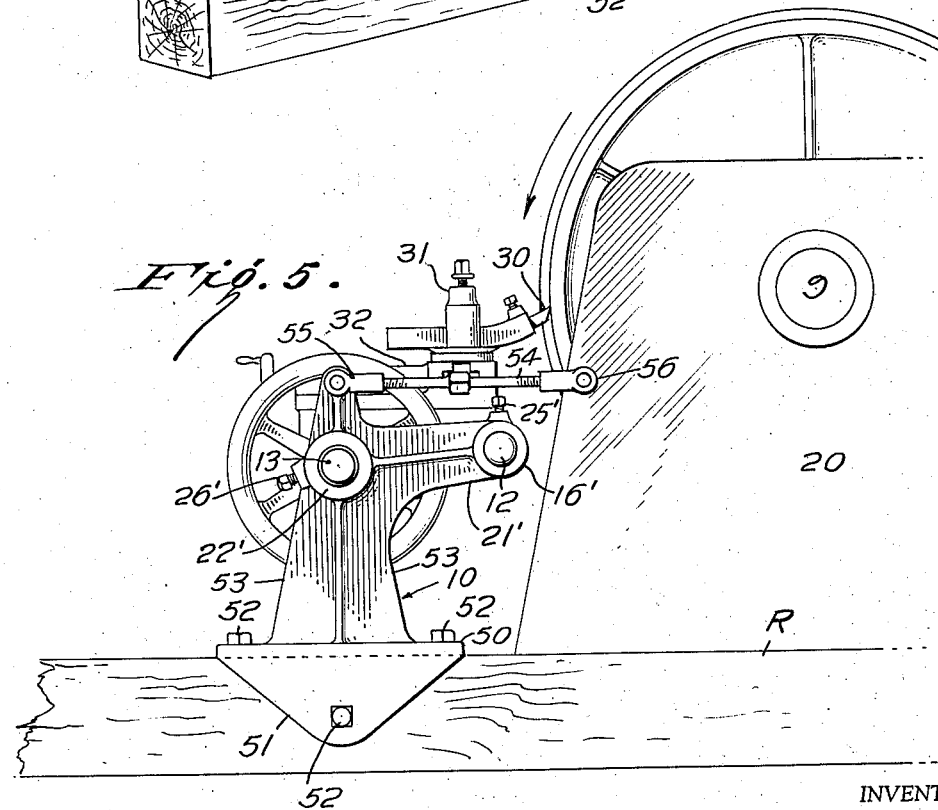
Figure 5 is a side elevation of the embodiment disclosed in Figure 4.

In the embodiment of my invention illustrated in Figures 4 and 5, the pair of carrier members 10 and 11, the rod 12 and the threaded shaft 13, together with the tool carriage mechanism 14 is substantially identical with the form of the invention already described. In each form it will be appreciated that an extremely rigid frame is provided for the carriage 14, due to the clamping of each end of both, the rod and the shaft 12 and 13 by means of the set-screws 25' and 26'.

I have found this form of the invention particularly well adapted to that type of winch which is supported on a pair of rails, for example, as shown at R in Figures 4 and 5. The carrier members 10 and 11, instead of being primarily supported by the side plates of the winch frame 20, and resting upon the bed of the winch by means of the vertical rods 15, are in this instance somewhat reversed. The carrier members 10 and 11 are each provided with a horizontal base member 50 having a right angular and vertical portion 51 in which are formed suitable openings for the provision of lag screws 52, or the like for firmly securing them to their respective rails R. Upstanding and suitably ribbed portions 53 are integrally formed with the base members 50 and the hub portions 16' and 22'.

The clamping members in this instance, consist of a pair of substantially horizontal turnbuckle rods 54, and clips 55 and 56. Each of the clips 55 are carried by the upper ends of the upstanding portions 53, whereas the clips 56 are suitably secured to the side members 20 of the winch. The required amount of rigidity may be readily imparted to the assembled truing-up device, with respect to the side walls of the winch frame by taking up all lost motion therebetween. This is accomplished by merely adjusting the turnbuckle rods after assembly. The various strains and thrusts are distributed in such a novel manner as to effectually eliminate all possibilities of vibration and chatter between the cutting tool and the brake drum, regardless of its hard or irregular surface.

It may be here stated that excellent results may be obtained by machining one brake drum at a time while the other, or mating drum, rides under slight tension, since the back-lash that is taken up is highly desirable in producing an extremely smooth and uniform cut with the minimum amount of chatter or other vibration.

It will now be readily appreciated that truing-up devices constructed in accordance with my invention may be easily moved from place to place, assembled, and the truing-up operation completed in the minimum amount of time. The very construction of the present invention also permits of its ready shipment or transport from place to place in the field, since its several parts may so easily be dismantled and packed to occupy a considerably small area.

What is claimed as new and useful is:—

1. A truing-up device for the brake drums of winches or hoists having a pair of relatively stationary side members and a rotatably mounted drum supported thereby, comprising a pair of carrier members adapted to be firmly gripped to said side members, a rod, a threaded shaft, both the rod and the threaded shaft being arranged in parallel with each other and with respect to said drum and connected with said carrier members to provide a rigid frame for the operative support thereon of the carriage hereinafter mentioned, a carriage provided with a pair of aligning bores for the reception of both, the said rod and threaded shaft, a carriage operating wheel having a hub portion adapted to be rotatably fitted within one of the said aligning openings and being interiorly threaded for engagement with the threaded rod for feeding the carriage in a lengthwise direction, a vertically extending auxiliary supporting rod adjustably carried by each of said carrier members and adapted to seat against a stationary portion adjacent said winch, and locking means for retaining said auxiliary supporting rods in their adjusted position.

2. A truing-up device for winches or the like having a stationary side member and a rotatable brake drum supported thereby, comprising a carrier member having a clamping portion associated therewith and adapted to be gripped to said side member in operative position, a rod, a threaded shaft, both the rod and said threaded shaft being arranged in parallel with each other and with respect to said drum, one end of said rod and threaded shaft being adjustably secured within the carrier member to provide a rigid carrier supporting frame, a tool carriage slidably mounted on both the said rod and the threaded shaft, said carriage being provided with two pairs of aligning bores for the reception of both the said rod and threaded shaft, and a hand-wheel having an interiorly threaded portion arranged to mesh with the threaded shaft for positively feeding said carriage along said rod and threaded shaft in a lengthwise direction.

3. A truing-up device for winches or the like having a stationary side member and a brake drum rotatably supported thereby, comprising a carrier member adapted to be gripped to said side member in operative position, a rod, a threaded shaft, both the rod and said threaded shaft being arranged in parallel with each other and with respect to said drum, one end of said rod and threaded shaft being adjustably secured within the carrier member, a tool carrier provided with a pair of aligning bores and slidably mounted on both the said rod and the threaded shaft, a carriage operating wheel having an interiorly threaded portion arranged to mesh with the threaded shaft for positively feeding said carriage along said rod and threaded shaft, and means carried by the carrier member for locking the end of said rod and threaded shaft in various adjusted positions to provide a rigid carriage supporting frame.

4. A truing up device for refinishing the brake drum of winches or hoists having a pair of relatively stationary side members and a rotatably mounted drum supported thereby, comprising a tool carriage, a supporting and operating frame therefor, which has a pair of carrier members fixedly associable with said stationary side members, a rod and a threaded shaft, parallel to one another and rigidly interconnected by said carrier members, said tool carriage operatively associated with and movable along and guided by said rod and said threaded shaft, and a hand wheel having an interiorly threaded hub portion to mesh with the threaded shaft and movable with the carriage for feeding the same along said rod and threaded shaft and parallel to the rotary axis of the drum when the hand wheel is turned.

5. A truing up device according to claim 4, in which the carrier members constitute upstanding bracket members each having a foot or base portion individually mounted in fixed relation to a corresponding fixed side member of the winch.

6. A truing up device according to claim 4, in which the carrier members constitute upstanding bracket members each having a foot or base portion individually mountable in fixed relation to a corresponding fixed side member of the winch, with the addition of adjustable rigidifying anti-swaying or anti-chattering bracing means between the top portion of each bracket member and the associated side member of the winch.

CARL A. BACKER.